UNITED STATES PATENT OFFICE.

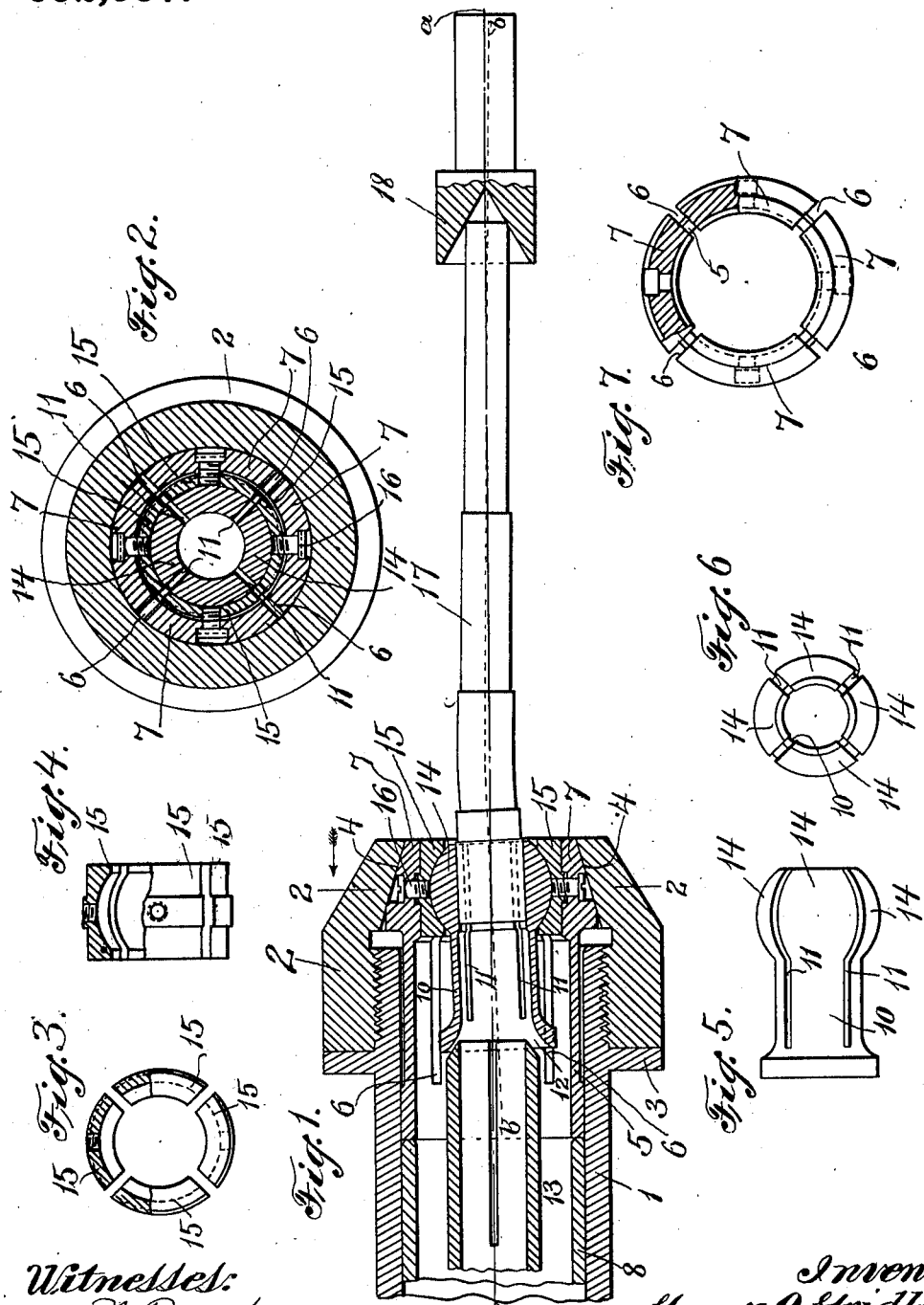
G. O. GRIDLEY.
UNIVERSAL CHUCK.
APPLICATION FILED AUG. 27, 1909.
992,957.
Patented May 23, 1911.
Witnesses:
Inventor:
George O. Gridley.
by Wright Brown Quimby & May
Attys.

GEORGE O. GRIDLEY, OF WINDSOR, VERMONT.

UNIVERSAL CHUCK.

992,957. Specification of Letters Patent. Patented May 23, 1911.

Application filed August 27, 1909. Serial No. 514,885.

To all whom it may concern:

Be it known that I, GEORGE O. GRIDLEY, of Windsor, in the county of Windsor and State of Vermont, have invented certain new and useful Improvements in Universal Chucks, of which the following is a specification.

This invention relates to a chuck for holding and rotating work which is to be formed by turning.

The object is to enable a piece of work to be held with its axis making any desired angle (within reasonable limits) with the axis of rotation of the chuck in order that a warped or crooked piece may be located as a whole approximately in coincidence with the axis of rotation of the chuck.

In other words it is my object to enable such a crooked or warped piece to be so held that in being turned down straight the stock which is removed in thus turning the piece down may be distributed over the whole length of the piece instead of wholly from the remote end of the piece and the neighborhood of said end. That is, if a warped piece of work such as a spindle should be grasped by the chuck with its grasped end in alinement with the axis of the chuck, its remote end would diverge more or less from this axis about which the work is rotated and in turning the piece down to straight form, most of the stock removed would be taken from the outer end of the piece.

My object is to enable the stock removed in straightening the work in this manner to be taken from the middle part or from the entire length of the piece instead of mainly from the end. Accordingly I have devised an adjustable member or collet for directly grasping the work which can be shifted so that its axis makes angles with the axis of the chuck as a whole in order that the center of the outer end of the work may be located on or near the axis of the chuck, or to set the work in such a way that the divergence thereof from a straight line may be located on opposite sides of the axis of the chuck instead of wholly on one side thereof.

In the accompanying drawings I have illustrated the mode of putting my invention into effect, the same being the mode at present preferred.

Figure 1 represents a longitudinal section of a chuck embodying the principles of my invention, showing a crooked work piece associated therewith, together with the female center for locating the free end of the work. Fig. 2 is a cross-section of the same on the line 2—2 of Fig. 1. Fig. 3 is a partial section and partial end elevation of a bushing forming part of the device. Fig. 4 is a partial longitudinal section and a partial side elevation of the same. Fig. 5 is an elevation of the angularly adjustable work-clamping collet. Fig. 6 is an end elevation of the same. Fig. 7 is a partial cross-section and end elevation of the outer collet or clamping portion of the chuck.

The same reference characters indicate the same parts in all the figures.

Referring to the drawings, which, it should be understood, are illustrative merely of one possible mode of carrying my invention into effect, the reference character 1 represents a work spindle which is adapted to be rotated and on the end of which the chuck is mounted.

2 represents a sleeve secured upon the end of the spindle, being preferably screwed thereupon and abutting against the collar 3. The outer end of this sleeve is conical and has a tapered internal surface 4 which serves to force the work-clamping jaws inward into gripping relation with the work.

5 represents a spring collet or chuck of ordinary form consisting of a tubular member which is slotted at two or more points (designated by the numeral 6) through a portion of its length to form spring jaws. These jaws are designated by 7 and are externally tapered so as to bear against the internal tapered surface 4 of the sleeve 2. When this collet is moved axially in one direction the engagement of the jaws with the surface 4 crowds them inward to clamp the work, and when moved in the opposite direction, the jaws spring outward and release the work.

8 is a longitudinally movable pusher tube for moving the collet in this manner.

10 is an inner collet which serves as the member for directly engaging the work. This collet is formed as a tube having longitudinal slots 11 which divide its outer end into a number of spring jaws. The inner end is made flaring at 12 in order to permit entrance into it of work fed through the spindle.

13 is a tube arranged centrally within the spindle for guiding the work into the collet 10.

The jaw portions 14 of the collet 10 are longitudinally convex externally,—that is they are formed as parts of a sphere, their outer surfaces constituting the equatorial zone of the sphere so as to serve as one member of a ball and socket joint. The other member of the joint consists of a bushing or socket member 15 secured to the jaws of the collet 5. This socket member is made of a ring which is divided into two or more parts which are connected by screws or other suitable fastening means 16 to separate jaws 7 of the collet 5. Thus the parts of the ring 15 are enabled to move toward and from each other with the movements of the jaws 7 to press upon the jaws 14 of the collet 10. The inner surface of the socket bushing is provided with a spherically concave groove which fits the spherical outer surface of the jaws 14. Thus the collet 10 is adapted to be shifted in any direction transverse to its axis within the limits of turning movement allowed by the shape of the collet 10 as a whole, and in any such position it has a normal bearing on the socket member.

The work is designated by 17 and in this case consists of a spindle or rod which is more or less warped or bent out of a straight line, the amount of distortion thereof being exaggerated for the purpose of illustration. When the collet 5 is forced against the surface 4 of the sleeve 2, the jaws 7 are crowded inward, bearing upon the jaws 14 of the inner collet and causing the latter to grip the work. By reason of the ball and socket connection between the outer and inner collets, the latter may be located so that its axis makes any desired angle with the axis of the chuck as a whole. By this arrangement the work piece 17 may be set so that both of its ends are in the axial line of the chuck, whereby the divergence of the work from its axis of rotation will be between the ends thereof. For thus locating the outer end of the work I provide a female center 18 which is located on the center line of the chuck. The line a—a represents the center line of the chuck and female center, and is also the axis of rotation of the chuck.

The dotted line b—b is the center line of the work. If a piece of work of such a character as that here shown were secured in an ordinary chuck, its free end would diverge widely from the axis of rotation and in turning down the work so as to be concentric with this axis the greater part of the stock removed would come from the outer end, with the result that this end might finally be made too small.

My invention, having provisions for holding the work at any angle with the axis of rotation, enables the center line of the work to coincide with or cross the axis of rotation at more than one point, either at the ends of the work or at a point located anywhere between the ends. Thus the work may be arranged so that its eccentricity or distortion lies on both sides of the axis of rotation, and any part of the length of the work may be made the eccentric part thereof. Thereby the stock removed in turning down the work to concentric form may be averaged or distributed over the work and the liability of making one end too small avoided.

This invention may be applied to any chuck where the work is intended to be fed from the rear through the spindle which carries the chuck or to be inserted through the front end. The invention may also be embodied in a variety of different mechanical constructions, its essentials being found in any structure having a gripping member which is capable of adjustment relatively to the chuck as a whole in such a way as to permit the angle between the center line of the work and the axis of rotation to be varied.

I claim:—

1. A chuck comprising a work-gripping member having jaws formed with spherically curved outer surfaces, an outer set of internally concave jaws engaging the convex surfaces of the first-named jaws and movable radially with respect to the axis of the chuck, and means for forcing the last-named jaws inward to crowd the work-gripping jaws against the work.

2. A chuck comprising a rotatable casing having a tapered surface, a set of outer jaws between which and the casing provision for relative axial movement is made, said jaws being arranged to engage the tapered surface of said casing so as to be forced inward upon such relative movement in one direction, a divided internal spherically concave ring secured to the jaws, and a work-gripping member having jaws spherically convex externally and arranged to bear on the spherically concave inner surface of said ring, whereby the said work-gripping member may be adjusted angularly with respect to said outer jaws and at the same time its jaws may be operated by inward movement of the outer jaws.

In testimony whereof I have affixed my signature, in presence of two witnesses.

GEORGE O. GRIDLEY.

Witnesses:
W. J. SAXIE,
RUTH P. KEYES.